(12) United States Patent
Voth et al.

(10) Patent No.: US 7,386,638 B2
(45) Date of Patent: *Jun. 10, 2008

(54) SYSTEM AND METHOD FOR PENDANT BUS FOR SERIALLY CHAINING MULTIPLE PORTABLE PENDANT PERIPHERALS

(75) Inventors: David William Voth, Woodinville, WA (US); Michael P. Calligaro, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

This patent is subject to a terminal disclaimer.

(21) Appl. No.: 11/186,273

(22) Filed: Jul. 21, 2005

(65) Prior Publication Data

US 2005/0251594 A1  Nov. 10, 2005

Related U.S. Application Data

(63) Continuation of application No. 10/159,899, filed on May 29, 2002, now Pat. No. 6,957,284.

(60) Provisional application No. 60/349,787, filed on Jan. 16, 2002.

(51) Int. Cl.
*G06F 13/00* (2006.01)
*G06F 3/00* (2006.01)
*G06F 13/42* (2006.01)

(52) U.S. Cl. .............................. 710/10; 710/710; 710/8; 710/9; 710/14; 710/15; 710/16; 710/17; 710/18; 710/19; 710/31; 710/33; 710/72; 710/3; 713/1; 713/100; 713/600

(58) Field of Classification Search .................... 710/3, 710/8–10, 14–19, 31, 33, 72; 713/1, 100, 713/600
See application file for complete search history.

(56) References Cited

U.S. PATENT DOCUMENTS

| 5,317,693 | A | * | 5/1994  | Cuenod et al. ................. 710/9 |
| 5,537,605 | A |   | 7/1996  | Teece .......................... 395/800 |
| 5,617,420 | A |   | 4/1997  | Whetsel ....................... 370/402 |
| 5,819,051 | A |   | 10/1998 | Murray et al. ............... 395/287 |

(Continued)

FOREIGN PATENT DOCUMENTS

EP  0468194 A2 * 1/1992

OTHER PUBLICATIONS

Hauck; "USB On-The-Go Protocol State Machines"; Jun. 12, 2002; Cypress Semiconductor.

*Primary Examiner*—Tammara Peyton
(74) *Attorney, Agent, or Firm*—Merchant & Gould P.C.; Ryan T. Grace

(57) ABSTRACT

A communications system is arranged for serially chaining multiple portable pendant peripherals to a portable host device. The system enables multiple low power input/output peripherals to communicate over a bi-directional data line with a portable host device such as a PDA or cellular phone. Fixed-length data packets are employed in a store-and-forward approach between the host device and the pendant peripherals. An upstream pendant system component controls a unidirectional clock signal that regulates data transfers to or from the host device and a downstream pendant peripheral. A device identification field associated with the data packet is incremented or decremented as the data packet is forwarded along the pendant bus chain until it reaches its destination.

18 Claims, 5 Drawing Sheets

U.S. PATENT DOCUMENTS 5,828,899 A * 10/1998 Richard et al. ............... 710/8
5,938,742 A * 8/1999 Faddell et al. ............... 710/9
6,545,411 B1 * 4/2003 Kim et al. ............... 313/582
6,665,742 B2 * 12/2003 Owen et al. ............... 710/10
6,686,530 B2 2/2004 Juszkiewica et al. ......... 84/600

* cited by examiner

SYSTEM AND METHOD FOR PENDANT BUS FOR SERIALLY CHAINING MULTIPLE PORTABLE PENDANT PERIPHERALS

RELATED APPLICATIONS

This application is a continuation of application Ser. No. 10/159,899, filed Mar. 29, 2002 now U.S. Pat. No. 6,957,284, which claims the benefit of United States Provisional Patent Application No. 60/349,787 filed Jan. 16, 2002.

FIELD OF THE INVENTION

The present invention relates generally to bus communication, and more particularly to a bus communication system and method for providing an inexpensive low-speed solution to chaining portable serial devices.

BACKGROUND OF THE INVENTION

Computing devices are becoming increasing more powerful and portable. With the increase in portability, end-users have also increased their desire to easily and inexpensively attach portable peripheral components to their portable computing devices. For example, an end-user purchasing a portable cellular phone or personal digital assistant (PDA) may wish to connect to it an external keypad, remote audio control, headphones, a game control device, and other similar low-speed portable devices. Moreover, the end-user may wish to connect many peripheral components at the same time to the portable host device.

Today, however, the end-user is provided a limited selection of portable peripheral components. Often, the selection is limited to a microphone and headphones. This limitation may arise because a host device manufacturer has implemented a proprietary bus architecture. The result is that the end-user is further limited to the peripherals provided by a single manufacturer.

While several bus architectures exist today, none of them provide a simple, cost-effective, low-speed portable device.

Therefore, there is a need in the art for a system and method for providing a general purpose, functional bus for chaining low-speed portable peripheral components to a portable host device. It is with respect to these considerations and others that the present invention has been made.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present invention provides a system and method for serially chaining multiple portable pendant peripherals to a portable host device. The system enables multiple low power input/output peripherals to communicate over a bi-directional data line with a portable host device such as a PDA or cellular phone. The method employs fixed-length data packets in a store-and-forward approach between the host device and the pendant peripherals.

In accordance with one aspect of the present invention, a peripheral communication device includes a pendant interface component, a host interface component, and a user device interface component. The pendant interface component is coupled to a first data line and a first clock line. The pedant interface component is arranged to receive a first clock signal from the first clock line. The pendant interface component also receives data from the first data line to provide a first received data, in a first operating mode. The pendant interface component sends a first transmit data to the first data line when in a second operating mode. Moreover, the pendant interface component is arranged to analyze the first received data to identify a device identifier that is associated with the received data from the first data line.

The host interface component is coupled to a second data line and a second clock line. The host interface component is arranged to provide a second clock signal to the second clock line and to receive data from the second data line to provide a second received data when in a third operating mode. The host interface component also sends a second transmit data to the second data line when in a fourth operating mode. The host interface component also processes the second received data to provide the first transmit data to the pendant interface component, and processes the first received data to provide the second transmit data when the first received data is associated with another device identifier.

The user device interface component is coupled to the pendant interface component and is arranged to receive the first received data and send the first transmit data.

In another aspect of the present invention, a communication system includes a host-computing device, a first pendant peripheral device, and a second pendant peripheral device. The host-computing device is arranged to receive a first received data and to send a first transmit data. The first pendant peripheral device is coupled to the host-computing device. The first pendant peripheral device is arranged to receive the first transmit data from, send the first received data to the host-computing device, and to further receive a second received data, and send a second transmit data. The second pendant peripheral device is coupled to the first pendant peripheral device. The second pendant peripheral device is arranged to communicate with the host-computing device by way of the second received data sent to the first pendant peripheral and the second transmit data received from the first pendant peripheral.

In yet another aspect of the present invention, a method of communicating a data packet includes receiving a data signal indicating an intent to transfer a data packet, receiving the data packet, analyzing a device identifier associated with the received data packet to determine whether the received data packet is to be transferred to another device. If the received data is to be transferred to another device, the method dynamically modifies the device identifier associated with the received data packet; and transfers the received data packet to another device.

In another aspect of the present invention, an apparatus for communicating a data packet includes a means for receiving the data packet, and a means for determining a device identifier associated with the received data packet. The apparatus also includes a means for selectively modifying the device identifier associated with the received data packet when the device identifier indicates another apparatus, and a means for transferring the modified data packet to the data line.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENTS

Figure 1:
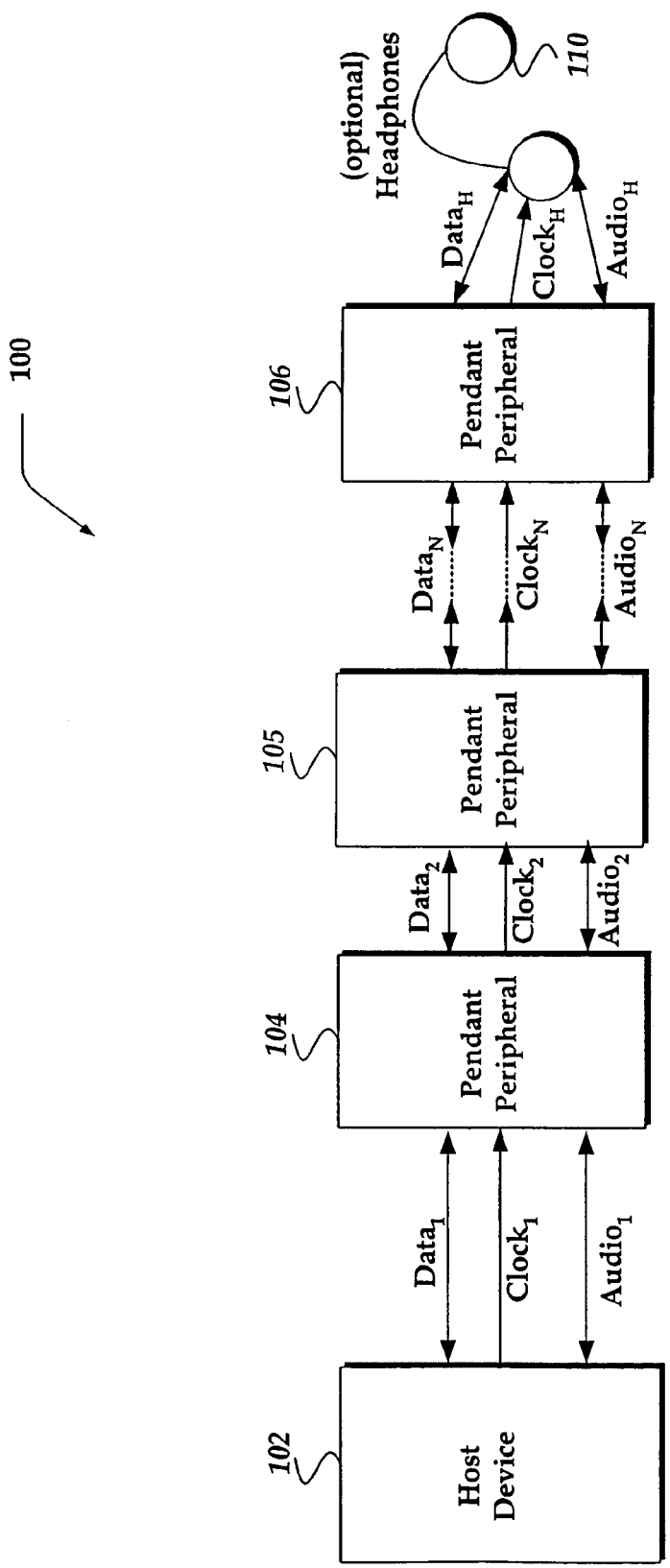
FIG. 1 illustrates a functional block diagram of an exemplary portable computing system incorporating a pendant bus system.

The present invention now will be described more fully hereinafter "with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," means a direct connection between the things that are connected, or an indirect connection through one or more either passive or active intermediary devices or components. The term "circuit" means one or more passive and/or active components that are arranged to cooperate with one another to provide a desired function. The term "signal" means at least one current signal, voltage signal, or data signal. The meaning of "a," "an," and "the" include plural references. The meaning of "in" includes "in" and "on."

Briefly stated, the present invention provides a system and method for serially chaining portable pendant peripherals to a portable host device. The system enables multiple low power input/output (I/O) peripherals to communicate over a bi-directional data line with a portable host device such as a PDA or cellular phone. Circuitry is included in the system to filter electromagnetic interference (EMI) and minimize affects of electrostatic discharge (ESD). The method employs fixed-length data packets in a store-and-forward approach between the host device and the peripherals. Enumeration of a pendant peripheral is dynamically determined by the location of the pendant peripheral in the chain. The enumeration method increments or decrements a device identifier within a communicated data packet such that every pendant peripheral perceives its device identifier to be zero, thereby minimizing enumeration overhead in the pendant peripheral.

It has been determined that none of today's bus architectures provide an inexpensive low-speed solution chaining portable serial devices.

For example, one well-known industry standard bus is the universal serial bus (USB). USB provides a relatively high-speed data flow of about 12-480 Mbps. However, USB also provides limited and potentially costly solutions. For instance, USB requires USB specific host hardware, of which few of today's portable devices contain. Moreover, USB cables require shielding to minimize radiated emissions that may make such cables impractical for the end-user to wear. Hence, USB bus architectures are impractical for portable peripherals.

Another common industry standard bus used to connect peripherals is the inter-integrated circuit bus (I2C). However, it too, has several limitations that make it unsuitable for chaining of portable peripheral devices. I2C does not provide a simple approach to 'hot' plugging and assigning of addresses to peripheral components. While there have been attempts to layer the I2C bus architecture to provide hot plugging capability, the results remain complex. Moreover, additional specialized hardware is often required that increases the weight and cost for the end-user.

Serial peripheral interface (SPI) is another bus architecture. SPI devices communicate using a master-slave relationship. However, due to its lack of built-in device addressing, SPI requires more effort and more hardware resources than I2C when more than one slave (peripheral device) is involved. Hence, SPI does not provide a practical and cost-effective solution for the end-user.

Illustrative Environment

FIG. 1 illustrates a functional block diagram of one embodiment of an exemplary pendant bus system 100, in accordance with the present invention.

As shown in the figure, pendant bus system 100 includes host device 102, pendant peripherals 104-106, and optional headphones 110. Optional headphones 110 may include an optional microphone (not shown). Optional headphones 110 also may be replaced by an optional microphone (not shown). It is understood that while only three pendant peripherals (104-106) are illustrated in FIG. 1, the present invention is not so limited, and additional pendant peripherals may be included without departing from the scope or spirit of the present invention. For example, in one embodiment, pendant bus system 100 includes up to about 16 pendant peripherals that are serially chained together.

In the nomenclature of pendant bus system 100, an "upstream" pendant peripheral is the pendant peripheral closest to host device 102 of two connected pendant peripherals, while a "downstream" pendant peripheral is the pendant peripheral furthest from host device 102.

Pendant peripherals 104-106 may include any of a number of low power, low speed portable I/O devices that an end-user may wish to connect to host device 102. For example, pendant peripherals 104-106 may include a portable audio player control device, a portable keypad, a portable game control device, and the like. Pendant peripherals 104-106 also may be configured to provide graphical displays, as well as audio output or input for the end-user. Pendant peripherals 104-106 are described in more detail in conjunction with FIG. 3.

A typical low speed portable I/O device, suitable as a pendant peripheral, includes devices with bus speeds of up to about 25 KHz. One example of the present invention provides for a pendant peripheral with a transfer rate of about 3.84 Kbits per second, with about 25% pendant bus utilization.

Host device 102 is in communication with pendant peripheral 104 through $data_1$, $clock_1$, and $audio_1$ lines. Pendant peripheral 104 is in communication with pendant peripheral 105 through $data_2$, $clock_2$, and $audio_2$ lines. Similarly, downstream pendant peripheral 106 is in communication with a prior pendant peripheral in the serial chain through $data_N$, $clock_N$, and $audio_N$ lines. Optional headphones 110 are in communication with pendant peripheral 106 through $data_H$, $clock_H$, and $audio_H$ lines.

$Data_{1-N\ and\ H}$ lines provide a bi-directional communication path for data packets to be sent between host device 102 and a pendant peripheral in the chain employing a store-and-forward approach. Communications typically occurs between host device 102 and pendant peripheral 104-106, and not between two pendant peripherals. An exemplary $data_1$ line is described in more detail below in conjunction with FIG. 2.

$Clock_1$ line provides a clock signal $Clk_1$ (not shown) that is driven by a clocking circuit (not shown) in host device 102. Clock signal $Clk_1$ is directed towards controlling the timing of data packet transfers between host device 102 and pendant peripheral 104. An exemplary clock signal $Clk_k$ is described in more detail below in conjunction with FIG. 4.

Similarly, $clock_2$ line provides a clock signal $Clk_2$ (not shown) that is driven by a clocking circuit (not shown) in pendant peripheral 104. $Clock_N$ line provides a clock signal $Clk_N$ (not shown) that is driven by a clocking circuit (not shown) in pendant peripheral 105; and $clock_H$ line provides a clock signal $Clk_H$ (not shown) that is driven by a clocking circuit (not shown) in pendant peripheral 106. That is, each clock line is always controlled by the upstream device. Moreover, each clock line is isolated from every other clock line. Each upstream device controls the transfer of data packets between itself and a downstream device, such that there is no contention for a data line.

$Audio_{1-N\ and\ H}$ lines support audio communications between host device 102 and optional headphones 100 (or optional microphone, not shown). Pendant peripherals 104-106 may also be configured to provide audio information on $audio_{2-N,\ and\ H}$ lines. Typically, however, audio information is 'passed' through pendant peripherals 104-106 to optional headphones 100. Moreover, it will be readily appreciated that $audio_{1-N,\ and\ H}$ lines may provide mono- or stereo-signals, without departing from the scope or spirit of the present invention.

A single cable is typically employed to bundle a given set of data, clock, and audio lines between two portable devices. For example, $data_1$, $clock_1$, and $audio_1$ lines are typically bundled into a single cable that may be coupled between host device 102 and pendant peripheral 104. A typical cable length may be upward towards six feet. Moreover, standard twisted unshielded cable may be employed, without departing from the scope or spirit of the present invention. Each cable employs a special 2.5 mm jack to couple the selected portable devices. The special 2.5 mm jack is downward compatible with standard 2.5 mm audio jack configurations.

Figure 2:
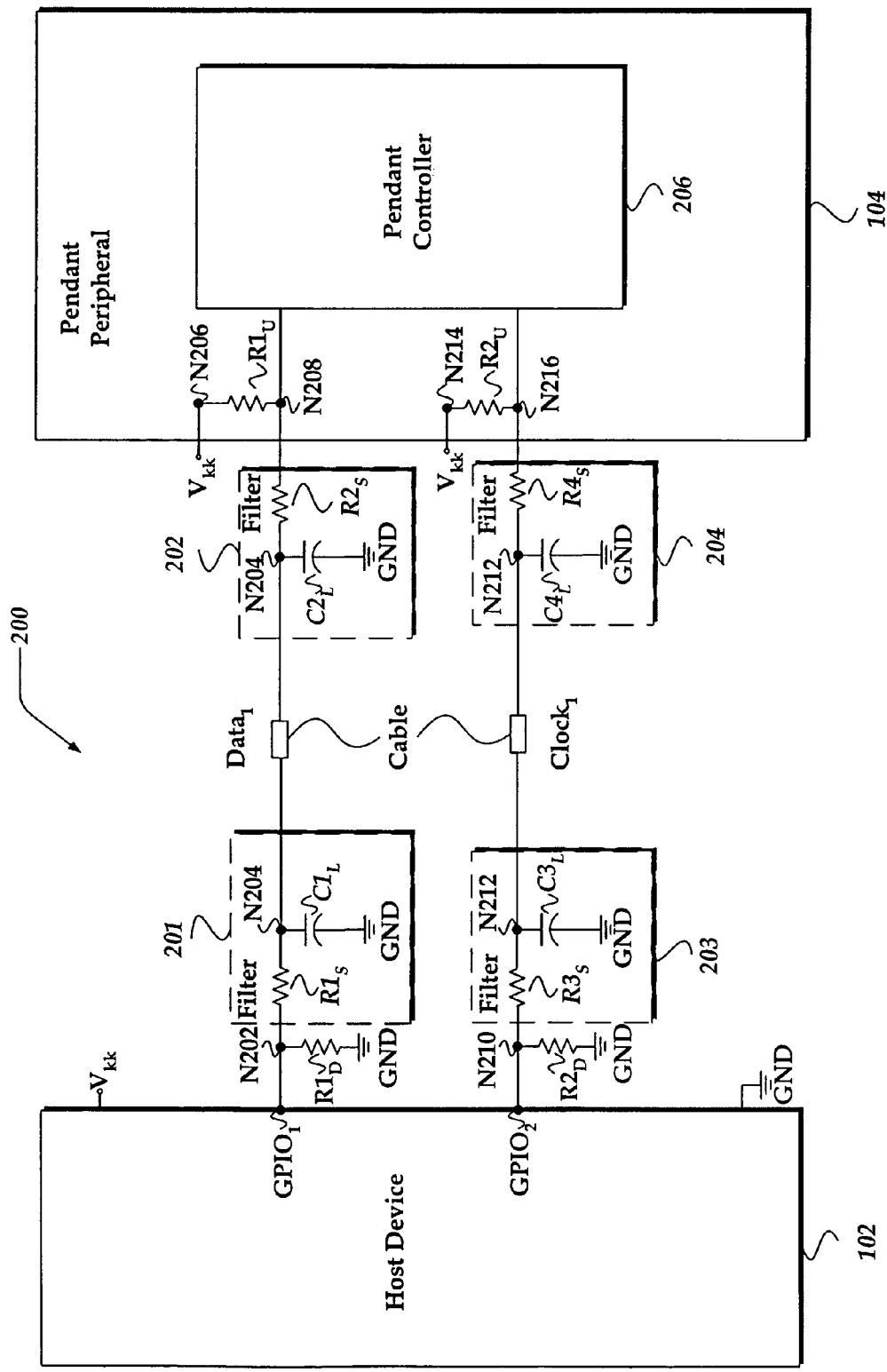
FIG. 2 is a schematic diagram illustrating exemplary data and clock lines, and circuitry of the pendant bus system shown in FIG. 1.

Included in each single cable are at least two additional lines (see FIG. 2). The first additional line provides power from host device 102 that may be employed by pendant peripherals 104-106. The second additional line provides a common ground. By providing power to pendant peripherals 104-106, a pendant peripheral need not include its own power source, thereby enabling it to be lighter in weight, and smaller in size.

FIG. 2 is a schematic diagram illustrating one embodiment of data and clock lines, and circuitry of pendant bus system 100 of FIG. 1, in accordance with the present invention. As seen in FIG. 2, host-pendant peripheral system 200 includes host device 102 and pendant peripheral 104, coupled through $clock_1$ line and a $data_1$ line. Pendant peripheral 104 includes pendant controller 206, which is described in more detail in conjunction FIG. 3.

As shown in FIG. 2, $data_1$ line includes a cable, a first pull-down resister $R1_D$, a first series-drive resister $R1_S$, a first load capacitance circuit $C1_L$, a second series-drive resister $R2_S$, a second load capacitance circuit $C2_L$, and a first pull-up resister $R1_U$. Also shown in the figure, first series-drive resister $R1_S$ and first load capacitance circuit $C1_L$ comprise filter 201, while second series-drive resister $R2_S$ and second load capacitance circuit $C2_L$ comprise filter 202.

Host device 102 is coupled to $data_1$ line at node N202 through a first general-purpose input/output connection $GPIO_1$. First pull-down resister $R1_D$ is coupled between node N202 and a circuit ground potential GND. First series-drive resister $R1_S$ is coupled between node N202 and node N204. First load capacitance circuit $C1_L$ is coupled between node N204 and circuit ground potential GND. Second load capacitance circuit $C2_L$ is coupled between node N204 and circuit ground potential GND. Second series-drive resister $R2_S$ is coupled between node N204 and node N208. First pull-up resister $R1_U$ is coupled between node N206 and node N208. Pendant controller 206 is coupled to $data_1$ line at node N208.

Also shown in FIG. 2, $clock_1$ line includes a second pull-down resister $R2_D$, a third series-drive resister $R3_S$, a third load capacitance circuit $C3_L$, a fourth series-drive resister $R4_S$, a fourth load capacitance circuit $C4_L$, and a second pull-up resister $R2_U$. Moreover, shown in the figure, third series-drive resister $R3_S$ and third load capacitance-circuit $C3_L$ comprise filter 203, while fourth series-drive resister $R4_S$ and fourth load capacitance circuit $C4_L$ comprise filter 204.

Host device 102 is also coupled to $clock_1$ line at node N210 through a second general-purpose input/output connection $GPIO_2$. Second pull-down resister $R2_D$ is coupled between node N210 and circuit ground potential GND. Third series-drive resister $R3_S$ is coupled between node N210 and node N212. Third load capacitance circuit $C3_L$ is coupled between node N212 and circuit ground potential GND. Fourth load capacitance circuit $C4_L$ is coupled between node N212 and circuit ground potential GND. Fourth series-drive resister $R4_S$ is coupled between node N212 and node N216. Second pull-up resister $R2_U$ is coupled between node N214 and node N216. Pendant controller 206 is also coupled to $clock_1$ line at node N216.

In one embodiment of the present invention, pendant peripheral 104 includes first and second pull-up resisters $R1_U$ and $R2_U$, and filters 202 and 204. Additionally, host device 102 includes first and second pull-down resisters $R1_D$ and $R2_D$, and filters 201 and 203.

In another embodiment, first pull-down resister $R1_D$ and second pull-down resister $R2_D$, are of approximately equal resistance values. Resistance values for first and second pull-down resisters $R1_D$ and $R2_D$ are selected to overcome any leakage current that may arise in $data_1$ line and $clock_1$ line, respectively, such that a "hard zero" value is approached when the line is unplugged. Typical values for first and second pull-down resisters $R1_D$ and $R2_D$ are between about 370K-10M ohms, and preferably are about 390K ohms. First, second, third, and fourth series-drive resisters $R1_S$, $R2_S$, $R3_S$, and $R4_S$, are all of approximately equal resistance values, ranging between about 0.95K to about 1.05K ohms. In one exemplary embodiment, first, second, third, and fourth series-drive resisters $R1_S$, $R2_S$, $R3_S$, and $R4_S$, are nominally 1K ohms. Moreover, first and second pull-resisters $R1_U$ and $R2_U$ are of approximately equal resistance values, ranging from between about 14K-16K ohms, and nominally about 15K ohms.

Similarly, first, second, third, and fourth load capacitance circuits $C1_L$, $C2_L$, $C3_L$, and $C4_L$ are approximately equal in capacitance values, ranging from between about 90 pF-110 pF, and nominally about 100 pF.

Filters 201-204 are arranged to operate as low-pass signal filters such that electromagnetic interference (EMI) is minimized on $data_1$ and $clock_1$ lines. Moreover, filters 201-204 also are arranged to protect against electrostatic discharges (ESD) of up to about 15 KV.

In operation, a supply voltage $V_{kk}$ from host device 102 is coupled to node N206 and to node N214, to provide limited power to pendant peripheral 104. Supply voltage $V_{kk}$ typically ranges between about 2.7V-3.6V, and is nominally about 3.V. Moreover, supply voltage $V_{kk}$, together with first pull-up resister $R1_U$ creates an open-collector circuit configuration that enables pendant devices to communicate bi-directionally on a single data line.

First pull-up resister $R1_U$ operates to hold a $data_1$ line signal in a high (typically, a non-active, logical 1) state until pendant peripheral 104 drives the $data_1$ line signal low (a logical 0). That is, if pendant peripheral 104 wants to send a data packet to host device 102, pendant peripheral 104 first asserts (drives low) the $data_1$ line signal.

When pendant-peripheral 104 is first coupled to $data_1$ line, first pull-up resister $R1_U$ operates to drive the $data_1$ line high, overriding a weak low signal level on $data_1$ line. Similarly, second pull-up resister $R2_U$ operates to pull the $clock_1$ line high. Once coupled to $data_1$ line, pendant peripheral 104 communicates a "plug" data packet to host device 102 by driving the $data_1$ line low, creating a logical 0. The drop in the $data_1$ line signal level is sensed by host device 102 and interpreted as pendant peripheral 104 being "plugged in."

When pendant peripheral 104 is unplugged or uncoupled from $data_1$ line, first pull-down resister $R1_D$ drives $data_1$ line to a ground potential. A logical 0 indicates a disconnect condition. Similarly, second pull-down resister $R2_D$ drives $clock_1$ line signal to a ground potential, creating a logical 0 on $clock_1$ line. When a downstream pendant peripheral, such as pendant peripheral 105 in FIG. 1 is unplugged, the upstream pendant peripheral detects the disconnect by sensing the logical 0 on the relevant data line. The upstream pendant peripheral then transmits a "disconnect" data packet to host device 102 indicating that a downstream pendant peripheral has been removed.

Figure 3:
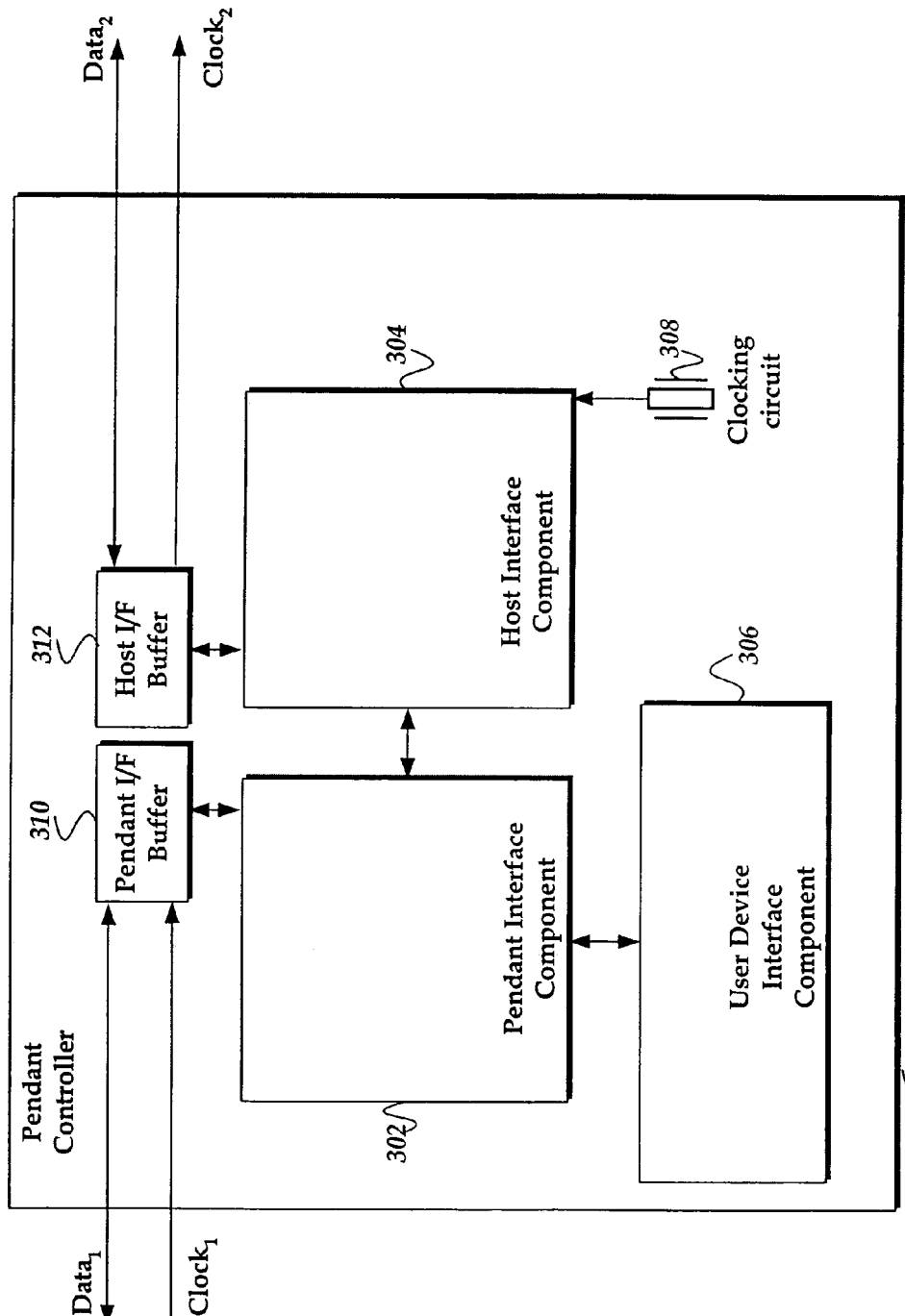
FIG. 3 is a functional block diagram of an exemplary pendant controller for managing interface communications.

FIG. 3 illustrates a functional block diagram of an embodiment of components in pendant controller 206 of FIG. 2 for managing interface communications, in accordance with the present invention. As shown in the figure, pendant controller 206 includes a pendant interface component 302, a host interface component 304, a user device interface component 306, a clocking circuit 308, pendant interface (I/F) buffer 310, and host interface (I/F) buffer 312.

Pendant controller 206 may have more components, features, or functionality than illustrated in FIG. 3. In one embodiment, pendant controller 206 is implemented as a microprocessor. However, it is understood that other controller types could be utilized without departing from the scope or spirit of the invention.

Clocking circuit 308 is in communication with host interface component 304. Clocking circuit 308 is provides a timing signal to host interface component 304. Clocking circuit 308 may be implemented as an oscillator, circuit, or any other timing device that provides timing signals. In one embodiment of the present invention, clocking circuit 308 provides a timing signal with a frequency of about 20 Khz.

Pendant I/F buffer 310 includes software and related hardware components that are in communication with $data_1$ and $clock_1$ lines, to provide storage space for data packets that are received from or sent to an upstream device. Pendant I/F buffer 310 is also in communication with pendant interface component 302.

Similarly, host I/F buffer 312 includes software and related hardware components that are in communication with $data_2$ and $clock_2$ lines, to provide storage space for data packets received from or to be sent to a downstream pendant peripheral device. Host I/F buffer 312 also is in communication with host interface component 304.

Pendant I/F buffer 310 and host I/F buffer 312 generally include volatile memory (e.g., RAM) and other storage components that are sufficient to store at least one second's worth of data packets. Moreover, Pendant I/F buffer 310 and host I/F buffer 312 should be of sufficient size such that buffer space is provided for at least one additional data packet originating from a downstream pendant peripheral. For example, if a keyboard pendant peripheral generates six data packets per second, then both pendant I/F buffer 310 and host I/F buffer 312 should accommodate at least six data packets, plus at least one additional data packet for the originating downstream pendant peripheral. In one embodiment of the present invention, pendant I/F buffer 310 and host I/F buffer 312 are implemented as first-in-first-out (FIFO) store and forward buffers.

Pendant interface component 302, host interface component 304, and user device interface component 306 includes software components resident in memory (not shown). Such memory may include volatile memory (e.g., RAM) and non-volatile memory (e.g., ROM, Flash Memory, and the like). Furthermore, pendant interface component 302, host interface component 304, and user device interface component 306 may be executed by an operating system (not shown) resident on pendant controller 206.

User device interface component 306 is d in communication with pendant interface component 302. User device interface component 306 is enabled to provide specific pendant peripheral actions. For example, if the pendant peripheral is a graphical display, user device interface component 306 receives text and graphics from pendant interface component 302. User device interface component 306 may then format the received text and graphics for display to the end-user. Similarly, user device interface component 306 receives inputs, such as keyboard commands, and the like, from the end-user.

Pendant interface component 302 is configured to manage data packets between an upstream device and user device interface 306. For example, pendant interface component 302 may receive a data packet from an upstream device, such as host device 102 (via pendant I/F buffer 3310), that directs user device interface component 306 to display text and graphics. Similarly, pendant interface component 302 may receive information from user device interface component 306 that needs to be packaged and communicated to an upstream device through pendant I/F buffer 310.

Pendant interface component 302 is also in communication with host interface component 304. Pendant interface component 302 is configured to determine when an upstream data packet is addressed to a downstream pendant peripheral. The pendant interface component 302 forwards the data packet to host interface component 304 when the upstream data packet is addressed to a downstream device.

Moreover, pendant interface component 302 is also configured to receive data packets from host interface component 304. All data packets for a downstream device are communicated to host device 102.

Pendant interface component 302 is configured to respond to clock signal $Clk_1$ from the $clock_1$ line within a certain period of time. Typically, pendant interface component 302 includes real time constraints to move data packets into or out of pendant I/F buffer 310. Thus, in one embodiment of the present invention, pendant interface component 302 is implemented as an interrupt driven software component driven by the falling edge of clock signal $Clk_1$.

Host interface component 304 is configured to manage data packets that are communicated with downstream pendant peripheral devices on the chain. Host interface component 304 is configured to process data packets that are received from pendant interface component 302 that are addressed to a downstream pendant peripheral device. Similarly, host interface component 304 is configured to process downstream data packets through host I/F buffer 312.

Moreover, host interface component 304 employs inputs from clocking circuit 308 to generate clock signal $Clk_2$. That is, host interface component 304 controls the transfer of data packets over $data_2$ line by driving the $clock_2$ line. Thus, host interface component 304 drives the real time constraints of the next downstream pendant peripheral. Additionally, because host interface component 304 drives clock signal $Clk_2$ on $clock_2$ line, it is not subject to the same real time constraints as pendant interface component 302.

Generalized Operation

The operation of the present invention will now be described with respect to FIGS. 1, 4, and 5. In the nomenclature of pendant bus system 100, in FIG. 1, a "read" is defined as moving a data packet from a pendant peripheral, such as pendant peripheral 104, to an upstream host device, such as host device 102. A "write" is defined as moving a data packet from an upstream host device, such as host device 102, to a downstream pendant peripheral, such as pendant peripheral 104. As described above in conjunction with FIG. 1, each set of clock and data lines between portable peripherals are isolated from each other, such that a "read" or "write" may occur separately between two pendant peripherals. For example, a "read" may occur when moving a data packet from pendant peripheral 105 to its upstream "host device," pendant peripheral 104. Similarly, an isolated "write" may occur when moving a data packet from pendant peripheral 104 downstream to pendant peripheral 105.

Additionally, a data packet includes a device identifier (deviceID) field that dynamically associates the data packet with a pendant peripheral on the pendant bus. Each time a data packet is forwarded upstream, a forwarding pendant peripheral increments the deviceID field in the data packet by one. Upon reaching host device 102, the deviceID indicates which pendant peripheral sent the data packet by where in the chain the pendant peripheral is located. Similarly, each time a data packet is forwarded downstream, a forwarding pendant peripheral decrements the deviceID field by one. When the deviceID is zero, the data packet has reached its destination. Thus, every pendant peripheral perceives its deviceID to be zero, thereby minimizing enumeration overhead on the pendant bus. Moreover, host device 102 need only maintain a list of the deviceIDs and characteristics of the pendant peripherals in the chain.

Referring briefly to FIG. 3, host interface component 304 decrements deviceIDs for data packets that are to be forwarded downstream, and increments the deviceIDs for data packets that are to be forwarded upstream.

Figure 4:
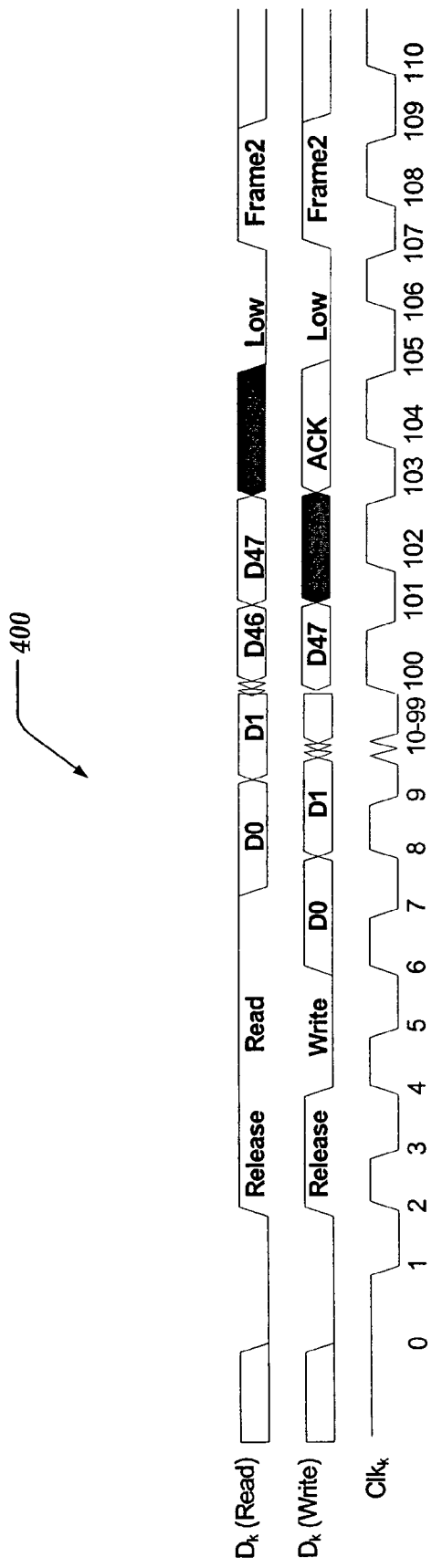
FIG. 4 illustrates a timing diagram of an exemplary pendant bus data packet transfer protocol.

FIG. 4 illustrates timing diagrams of an exemplary pendant bus data packet transfer protocol 400, in accordance with the present invention. In this example, pendant bus data packet transfer protocol 400 is employed to move 48 bit data packets between a host device and a pendant peripheral, such as described above in conjunction with FIG. 1.

Shown in FIG. 4 are a read data signal $D_k$ and a write data signal $D_k$. The write data signal $D_k$ illustrates signals that are written from the host device to a pendant peripheral device over a $data_k$ line. The read data signal $D_k$ illustrates signals that read by the host device over $data_k$ line. That is, the same $data_k$ line may be employed at one time to send write data signal $D_k$, and at a later time, for a read data signal $D_k$. For ease of reference therefore, the read data signal $D_k$ and the write data signal $D_k$ have been separately illustrated. Moreover, in the discussion below, data signal $D_k$ may refer to the write or read data signal $D_k$, depending on surrounding events.

Also shown in the figures is clock signal $Clk_k$ that is controlled by an upstream device over $clock_k$ line. Clock edges are indicated by the numbers (0-99) below clock signal $Clk_k$. It is important to note that a clock period need not be of fixed duration. That is, the upstream device driving the clock signal $Clk_k$ may hold a clock signal for a varying duration, thereby delaying data signal $D_k$ transfers. Furthermore, a pendant peripheral data transfer occurs on the falling edge of clock signal $Clk_k$, while upstream host devices place data packets onto $data_k$ line at the leading edge of clock signal $Clk_k$.

Typically, a framing bit is communicated by the write data signal $D_k$ at the beginning of a data packet transfer. The framing bit enables the host device to determine when a downstream pendant peripheral is out of synchronization. Thus, if after transmitting a framing bit, a read data packet of all ones is received by the upstream device, the data packet is discarded as invalid. Moreover, write data packets are retransmitted if the downstream pendant peripheral does not respond with an acknowledge (ACK) bit.

As shown in FIG. 4 prior to clock edge 0, first and second pull-up resisters $R1_U$ and $R2_U$ pull the $data_k$ and $clock_k$ lines high (see FIG. 2). While $data_k$ and $clock_k$ lines are high, a downstream pendant peripheral may request a read at any time, by driving (i.e., asserting) data signal $D_k$ low.

The upstream host device also may commence a write at any time or, when interrupted, start a read transfer. At clock edge 1, the host device drives clock signal $Clk_k$ low to begin a transfer. The downstream pendant peripheral sees the falling edge of clock signal $Clk_k$, and releases data signal $D_k$ to high. The host device releases clock signal $Clk_k$, allowing it to go high at clock edge 2.

At clock edge 3, the host device reads data signal $D_k$ to determine if it is high. If data signal $D_k$ is low, the host device determines that a framing error has occurred. Alternatively, if the data signal $D_k$ is high, the host device continues, and drives clock signal $Clk_k$ low.

At clock edge 4, the host device releases clock signal $Clk_k$ to high. The host device also drives directional information onto the $data_k$ line. If the host device drives data signal $D_k$ low, a write transfer is intended. If the host device releases data signal $D_k$ high, a read transfer is expected. This is illustrated in FIG. 4 by the separate timing diagrams for read and write data signal $D_k$.

At clock edge 5, the host device drives clock signal $Clk_k$ low. The downstream pendant peripheral reads data signal $D_k$ to determine the direction of the data packet transfer. If data signal $D_k$ indicates a write, but the downstream pendant peripheral had desired to transmit a data packet upstream, the data write takes precedence. The downstream pendant peripheral withholds its intended data transfer until the host device is ready to receive it.

At clock edge 6, the host device releases clock signal $Clk_k$ to high. If data is to be written, the host device also "places" data bit D0 onto data$_k$ line to drive data signal $D_k$.

At clock edge 7, the host drives clock signal $Clk_k$ low. When the downstream pendant peripheral sees the falling edge of the clock signal $Clk_k$, it drives data bit D0 (in the case of a read), or latches data bit D0 (in the case of a write).

At clock edges 8-9, the host device releases clock signal $Clk_k$ high, and in the case of a write, the host device also drives data bit D1. The host device latches data bit D0, in the case of a read. The host device drives clock signal $Clk_k$ low. For clock edges 10-99, the data packet transfer protocol continues for data bits D1-D46, substantially as described above in conjunction with clock edges 6-9.

At clock edge 100, the host device releases clock signal $Clk_k$ high. In the case of a write, the host device simultaneously drives data bit D47. The downstream pendant peripheral continues to ignore leading edge clock signal $Clk_k$ transitions.

At clock edge 101, the host device drives clock signal $Clk_k$ low. In the case of a read, the downstream pendant peripheral drives data bit D47. In the case of a write, the downstream pendant peripheral latches data bit D47.

Clock edges 102-103 are directed at providing a confirmation that the downstream pendant peripheral received the data packets. Thus, at clock edge 102, the host releases both clock signal $Clk_k$ and data signal $D_k$ to high. The host device then drives clock signal $Clk_k$ low. In the case of a write, the pendant peripheral makes a determination whether it has sufficient buffer space for the data packet. If the downstream pendant peripheral has sufficient buffer space to accept the write data packet, it releases data signal $D_k$ to high, indicating an ACKnowledgement of the write. If however, the downstream pendant peripheral determines that it does not have sufficient buffer space for the write data packet, it drives data signal $D_k$ low. The host device retransmits the entire data packet, substantially as described above upon seeing data signal $D_k$ low.

Clock edges 104-109 are provided for a framing and cable check. At clock edge 104, the host device releases clock signal $Clk_k$ to high. The host device drives clock signal $Clk_k$ low, at clock edge 105. When the pendant peripheral sees clock signal $Clk_k$ go low, it drives data signal $D_k$ low. The host device releases clock signal $Clk_k$ high, at clock edge 106. The host device examines data signal $D_k$ to determine if it is low. If data signal $D_k$ is low, the host device drives clock signal $Clk_k$ low at clock edge 107, followed by a high at clock edge 108. The host device re-examines data signal $D_k$. If data signal $D_k$ is high, the framing cable check is considered successful. The host device proceeds to drive clock signal $Clk_k$ low at clock edge 109. Alternatively, if data signal Dk remained low, the host device determines that a framing error exists.

At clock edge 110, the host device releases clock signal $Clk_k$ high. The pendant bus is ready to perform another read or write. If a downstream pendant peripheral drives data signal $D_k$ low, indicating a desire to transfer data packets, pendant bus transfer protocol 400 proceeds to perform substantially the same actions as described above.

Errors may arise during a data packet transfer for several reasons. For example, errors may arise when a pendant peripheral is disconnected from the pendant bus system. Therefore, after a data packet is transferred, clock signal $Clk_k$ is examined. If clock signal $Clk_k$ is low, the host device determines that no pendant peripheral is coupled to the pendant bus.

A framing error may occur due to a data packet being out of sequence. The host device attempts to correct for the detected framing error situation. In one embodiment, the host device sends a reset signal to the downstream pendant peripheral. When the host device pulses clock signal $Clk_k$ low for an extended period of time, downstream pendant peripheral interprets this as a hard reset request. The downstream pendant peripheral performs a self-reset, and passes the reset pulse clock signal $Clk_k$ to the next downstream pendant peripheral in the chain.

In another embodiment of the present invention, the host device attempts to correct the detected framing error, by varying the period of its clock signal $Clk_k$. This action is intended to correct for detected framing errors that may arise due to an events as unreliable data line, a pendant peripheral that may be unable to keep up with the clock, and the like.

Figure 5:
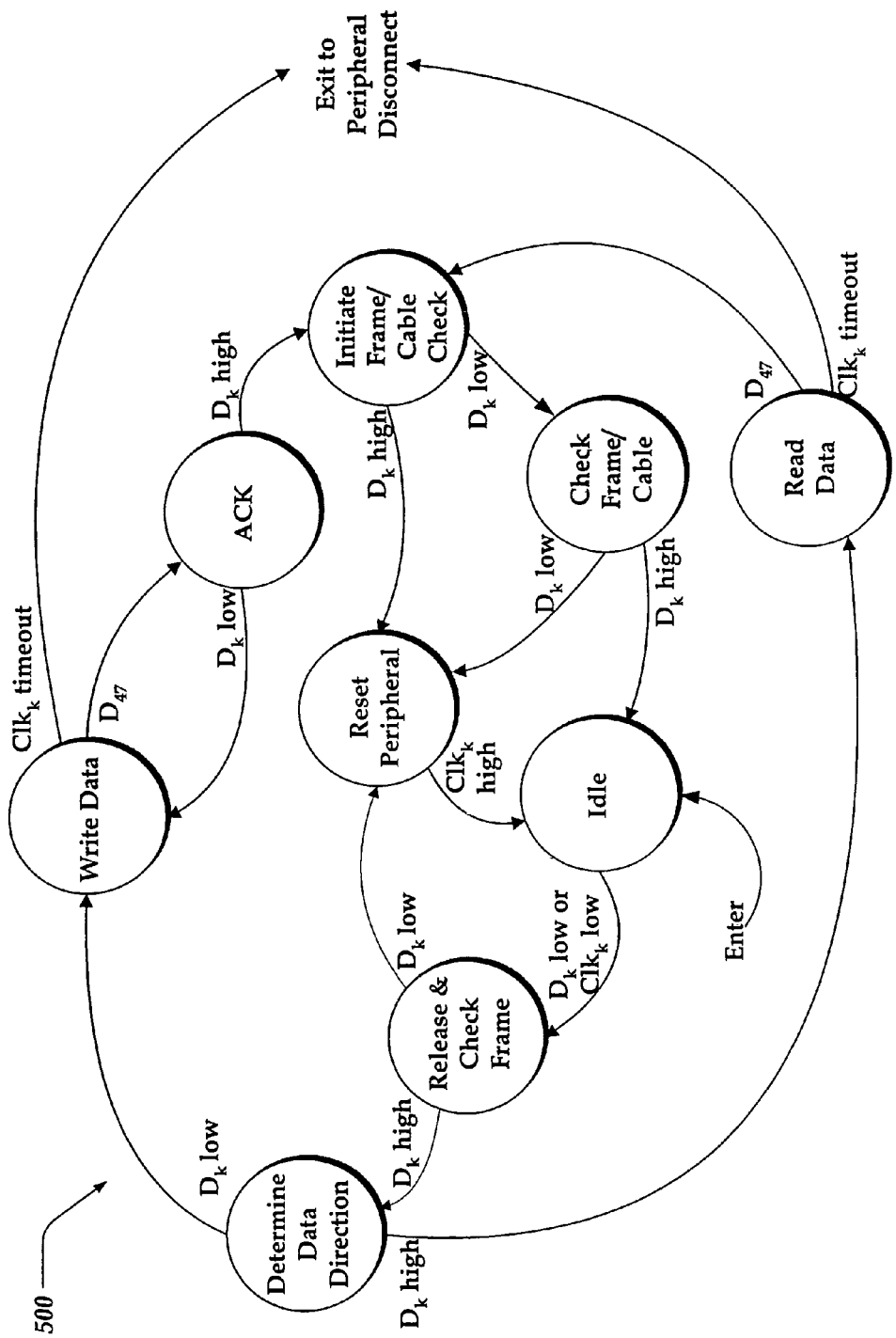
FIG. 5 illustrates one embodiment of a state transition diagram of the pendant bus system, in accordance with the present invention.

FIG. 5 illustrates one embodiment of a state transition diagram 500 of the pendant bus system, in accordance with the present invention. As shown in the figure, annotations next to an arrow represent a trigger or event that initiates a transition from a current state of the pendant bus system (illustrated as a circle) to a next state of the pendant bus system. Clock signal $Clk_k$ is not illustrated in FIG. 5. However, it is understood that transitions through states require a clock signal $Clk_k$ edge.

As shown in FIG. 5, state transition diagram 500 is entered at an Idle state. The Idle state corresponds to clock edge 0 in FIG. 4. During the Idle state, clock signal $Clk_k$ and data signal $D_k$ are high. If a host device desires to write a data packet, the host device drives clock signal $Clk_k$ low. If a downstream pendant peripheral desires to request a read of a data packet by the host device, the pendant peripheral drives data signal $D_k$ low. If either event occurs, the pendant bus system transitions to a Release & Check Frame state. The Release & Check Frame state corresponds to clock edges 2-3 in FIG. 4.

In the Release & Check Frame state, the host device checks to determine if the pendant peripheral has released data signal $D_k$ to high. If it is determined that data signal $D_k$ is low, host device interprets this as a framing error and the pendant bus system transitions to a Reset Peripheral state. Alternatively, if it is determined that data signal $D_k$ is released high, the pendant bus system proceeds to a Determine Data Direction state.

In the Reset Peripheral state, the host device pulses clock signal $Clk_k$ low for an extended period of time, to direct a hard reset to all downstream pendant peripherals. Each downstream pendant peripheral receives the pulsed clock signal $Clk_k$, performs a self-reset, and forwards it downstream. After an extended period of time, the host device releases clock signal $Clk_k$ to high and the pendant bus system proceeds to the Idle state to perform other actions.

In Determine Data Direction state, the host device determines whether a data packet transfer shall be a write data packet or a read data packet. A read data packet may arise for example, when the downstream pendant peripheral is forwarding upstream data packets received from another pendant peripheral further downstream. A read data packet may also arise when the downstream pendant peripheral has data packets from its own user interface component (see FIG. 3) to be transferred upstream.

If it is determined that the data packet transfer is to be a write data packet, the host device drives data signal $D_k$ low, and the pendant bus system transitions to a Write Data state. Alternatively, if it is determined that data signal $D_k$ is high, the pendant bus system proceeds a Read Data state.

In the Write Data state, the host device places data bits D0-D47 onto the $data_k$ line. After the write data packet is transferred, host device examines clock signal $Clk_k$ to determine if it has drifted to low (i.e., a $Clk_k$ timeout). If clock signal $Clk_k$ has drifted low then host device concludes that the $Clk_k$ timeout is a result of a disconnect of the downstream pendant peripheral. The pendant-bus system proceeds to exit the states illustrated in FIG. 5, to perform other actions. Alternatively, if it is determined that a $Clk_k$ timeout has not occurred, upon transfer of the data bit D47, the pendant bus system proceeds to transition to an ACK (acknowledge) state. The ACK state corresponds to clock 103 cycle in FIG. 4.

In the ACK state, the host device drives clock signal $Clk_k$ low, and releases data signal $D_k$. If the write data packet is successfully received by the downstream pendant peripheral, data signal $D_k$ remains high; otherwise, if the write data packet is not successfully received, the downstream pendant peripheral drives data signal $D_k$ low.

If it is determined that data signal $D_k$ is low, the pendant bus system returns to the Write Data state, to retransmit the entire data packet, substantially as described above. Although not illustrated in FIG. 5, in one embodiment of the invention, if the host device determines that it has retransmitted the data packet multiple times, the host device determines that a possible framing error has occurred. The pendant bus system proceeds to the Reset Peripheral state.

Alternatively, in the ACK state, if it is determined that data signal $D_k$ is high, the pendant bus system proceeds to an Initiate Frame/Cable Check state. In the Initiate Frame/Cable Check state, the downstream pendant peripheral is expected to drive data signal $D_k$ low. If the host device determines that data signal $D_k$ is low, the pendant bus system moves to a Check Frame/Cable state. Alternatively, if in the Initiate Frame/Cable Check state, it is determined that data signal $D_k$ is high then a framing/cable error likely has occurred. The pendant bus system proceeds to the Reset Peripheral state.

In the Check Frame/Cable state, the downstream pendant peripheral is expected to drive data signal $D_k$ high. If the host device determines that data signal $D_k$ is high, the pendant bus system proceeds to the Idle state, to perform other actions.

Similarly, if in the Check Frame/Cable state, it is determined that data signal $D_k$ is low, then a framing/cable error likely has occur occurred, and the pendant bus system moves to the Reset Peripheral state.

In the Reset Peripheral state, as described above the host device pulses clock signal $Clk_k$ low for an extended period of time, to direct a hard reset to all downstream pendant peripherals. After an extended period of time, host device releases clock signal $Clk_k$ to high and the pendant bus system proceeds to the Idle state to perform other actions.

In the Read Data state, the downstream pendant peripheral drives data bits D0-D47 onto $data_k$ line according to the host device clock signal $Clk_k$ edges.

After each read data bit is transferred, in the Read Data state, the host device examines clock signal $Clk_k$ to determine if it has drifted to low (i.e., $Clk_k$ timeout). If clock signal $Clk_k$ has drifted low then host device concludes that it is a result of a disconnect of the downstream pendant peripheral and the pendant bus system proceeds to exit the states illustrated in FIG. 5, to perform other actions. Alternatively, if it is determined that a clock signal $Clk_k$ timeout has not occurred, upon transfer of data bit D47, the pendant bus system proceeds to transition to the Initiate Frame/Cable Check state, to perform substantially the same actions as described above.

Although not illustrated in FIG. 5, upon completion of a write data transfer, the pendant interface component 302 of the receiving pendant peripheral proceeds to process the data packets. Pendant interface component 302 examines the deviceID associated with the data packets to determine ownership. If it is determined that the deviceID is zero, then pendant interface component 302 concludes that it owns the data packets. Pendant interface component 302 may transmit the data packets to user device interface component 306 (in FIG. 3) for further processing. Pendant interface component 302 may also perform other actions associated with the received data packets.

Alternatively, if the deviceID is other than zero, then the pendant interface component 302 concludes that the data packets are destined for a downstream pendant peripheral. Pendant interface component 302 then transmits the data packets to host interface component 304 (see FIG. 3) for further processing.

If the data packets are destined for a downstream pendant peripheral, host interface component 304 decrements the deviceID associated with the data packets. Host interface component 304 manages the transfer of the modified data packets by performing substantially the same actions as described above.

Similarly, upon completion of a read data transfer, the upstream host device manages the received data packets. If the upstream host device is another pendant peripheral, the deviceID associated with the data packets is incremented and the modified data packets are then transferred upstream by performing substantially the same actions as described above.

The above specification, examples, and data provide a complete description of the manufacture and use of the composition of the invention. However, various changes in size, shape, materials, components, circuit elements, wiring connections, and contacts, as well as in the details of the illustrated circuitry and construction and method of operation may be made without departing from the scope or spirit of the present invention. Thus, the invention resides in the claims hereinafter appended.

We claim:

1. A method of communicating a data packet, the method comprising:

receiving a first data signal driven by a sending device according to a first clock signal;

receiving a data packet associated with the first data signal;

analyzing a device identifier associated with the received data packet to determine whether the received data packet is for another device;

when the received data packet is for another device:

modifying the device identifier associated with the received data packet;

generating a second data signal;

associating the received data packet with the second data signal; and driving the second data signal to another device according to a second clock signal.

2. The method of communicating a data packet of claim 1, wherein modifying the device identifier comprises:

incrementing a device identifier associated with the received data packet when the received data packet is for an upstream device; and decrementing a device identifier associated with the received data packet when the received data packet is for a downstream device.

3. The method of claim 1, wherein the first clock signal is different from the second clock signal.

4. The method of claim 1, wherein receiving a first signal driven by a sending device includes receiving the first signal on a trailing edge of the first clock signal.

5. The method of claim 1, further comprising buffering the first data signal to store the first data signal.

6. The method of claim 1, further comprising buffering the second data signal to store the second data signal.

7. A computer apparatus for communicating a data packet, comprising:

a data receiving means, wherein the data receiving means receives a data packet associated with a first data signal driven by a first clock signal of a sending apparatus;

a modifying means, wherein the modifying means modifies a device identifier associated with the data packet when the device identifier indicates another apparatus;

a signal generating means, wherein the signal generating means generates a second data signal and associate the data packet with the second data signal when the device identifier indicates another apparatus; and a driving means, wherein the driving means drives the second data signal to another apparatus according to a second clock signal.

8. The apparatus of claim 7, wherein the modifying means decrements the device identifier when the data packet is driven downstream to another apparatus.

9. The apparatus of claim 7, wherein the modifying means increments the device identifier when the data packet is driven upstream to another apparatus.

10. The apparatus of claim 7, wherein the driving means includes a clock means, wherein the clock means manages the communication of a signal.

11. The apparatus of claim 7, further comprising a first buffer means, wherein the first buffer means stores a first data signal driven by an upstream sending apparatus.

12. The apparatus of claim 11, further comprising a second buffer means, wherein the second buffer means stores a first data signal driven by a downstream sending apparatus.

13. A computer-readable storage medium having computer executable instructions for communicating a data packet, the instructions comprising:

receiving a first data signal driven by a sending device according to a first clock signal;

receiving a data packet associated with the first data signal;

analyzing a device identifier associated with the received data packet to determine whether the received data packet is for another device;

when the received data packet is for another device:

modifying the device identifier associated with the received data packet;

generating a second data signal;

associating the received data packet with the second data signal; and driving the second data signal to another device according to a second clock signal.

14. The computer-readable storage medium of claim 13, wherein modifying the device identifier comprises:

incrementing a device identifier associated with the received data packet when the received data packet is for an upstream device; and decrementing a device identifier associated with the received data packet when the received data packet is for a downstream device.

15. The computer-readable storage medium of claim 13, wherein the first clock signal is different from the second clock signal.

16. The computer-readable storage medium of claim 13, wherein receiving a first signal driven by a sending device includes receiving the first signal on a trailing edge of the first clock signal.

17. The computer-readable storage medium of claim 13, further comprising buffering the first data signal to store the first data signal.

18. The computer-readable storage medium of claim 13, further comprising buffering the second data signal to store the second data signal.

* * * * *